(12) United States Patent
Shimahashi et al.

(10) Patent No.: US 10,200,570 B2
(45) Date of Patent: Feb. 5, 2019

(54) IMAGE PROCESSING APPARATUS FOR PERFORMING REDUCTION PROCESS TO REDUCE AMOUNT OF SPECIFIC COLOR MATERIAL TO BE USED

(71) Applicant: BROTHER KOGYO KABUSHIKI KAISHA, Nagoya, Aichi (JP)

(72) Inventors: Takuya Shimahashi, Nagoya (JP); Akidi Yoshida, Nagoya (JP); Shota Morikawa, Nagoya (JP); Kazuyuki Miyaki, Ichinomiya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 15/598,373

(22) Filed: May 18, 2017

(65) Prior Publication Data

US 2018/0007238 A1    Jan. 4, 2018

(30) Foreign Application Priority Data

Jun. 30, 2016  (JP) .................... 2016-129834

(51) Int. Cl.
*H04N 1/60* (2006.01)
*H04N 1/64* (2006.01)
*H04N 1/405* (2006.01)

(52) U.S. Cl.
CPC .......... *H04N 1/6063* (2013.01); *H04N 1/405* (2013.01); *H04N 1/6008* (2013.01); *H04N 1/6072* (2013.01); *H04N 1/644* (2013.01)

(58) Field of Classification Search
USPC ........................................ 358/1.14
See application file for complete search history.

(56) References Cited

U.S. PATENT DOCUMENTS

2005/0036156 A1\*  2/2005  Hamamura ............ H04N 1/393
                                                              358/1.2
2005/0146755 A1\*  7/2005  Shimokawa ....... H04N 1/00416
                                                              358/453

(Continued)

FOREIGN PATENT DOCUMENTS

JP    H05-225378 A    9/1993
JP    2002-288589 A   10/2002

(Continued)

*Primary Examiner* — Neil R McLean
*Assistant Examiner* — Darryl V Dottin
(74) *Attorney, Agent, or Firm* — Scully, Scott, Murphy & Presser, P.C.

(57) ABSTRACT

In an image processing apparatus a controller acquires target image data representing an image including first and second type of objects. The controller specifies, as a specific type color material, one of first and second type of color materials whose remaining amount is smaller than that of the other, and determines a first reduction index value indicating a first degree of reduction in an amount of the specific type color material for printing the first type of object. The controller creates processed data by performing a reduction process on the target image data to reduce an amount of the specific type of color material for printing the first type of object on the basis of the first reduction index value. An amount of the specific type color material for printing the second type object is not reduced on the basis of the first reduction index value.

13 Claims, 6 Drawing Sheets

(56) References Cited

U.S. PATENT DOCUMENTS

| | | | |
|---|---|---|---|
| 2007/0058188 A1* | 3/2007 | Nakahara | H04N 1/6022 358/1.13 |
| 2009/0086232 A1* | 4/2009 | Ohira | H04N 1/00204 358/1.9 |
| 2013/0028520 A1 | 1/2013 | Kondo et al. | |
| 2015/0172512 A1 | 6/2015 | Otake | |

FOREIGN PATENT DOCUMENTS

| | | |
|---|---|---|
| JP | 2007-292871 A | 11/2007 |
| JP | 2010-200222 A | 9/2010 |
| JP | 2013-030090 A | 2/2013 |
| JP | 2015-115838 A | 6/2015 |

\* cited by examiner

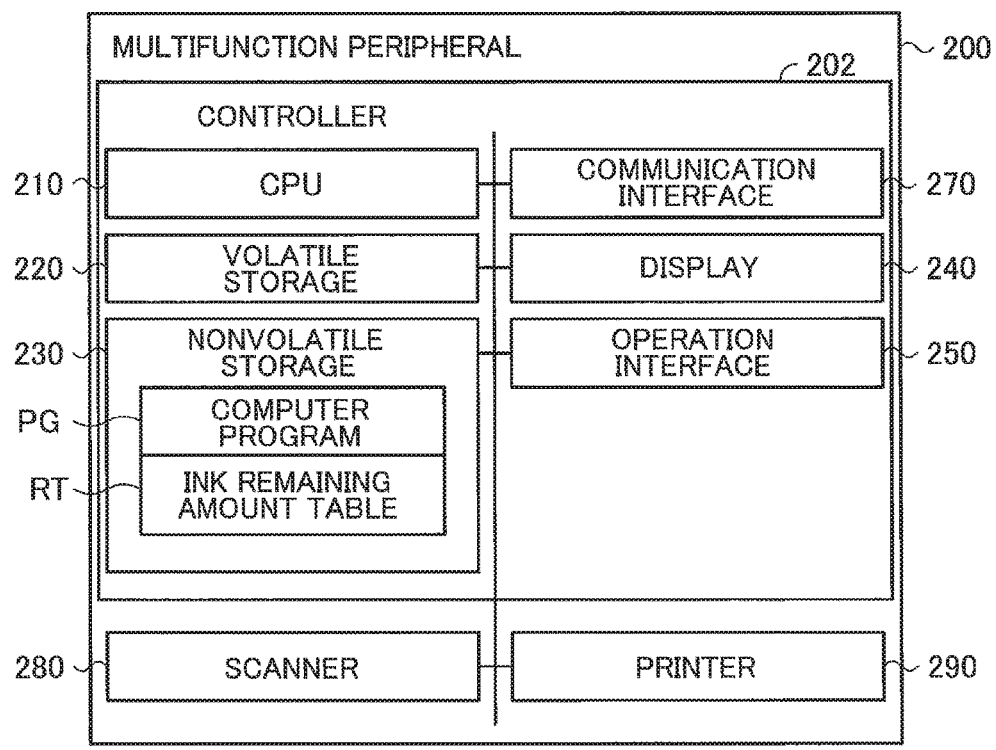

TONE CURVE FOR TEXT
REDUCTION RATE 50%

TONE CURVE FOR GRAPHIC
REDUCTION RATE 40%

TONE CURVE FOR PHOTOGRAPH
REDUCTION RATE 30%

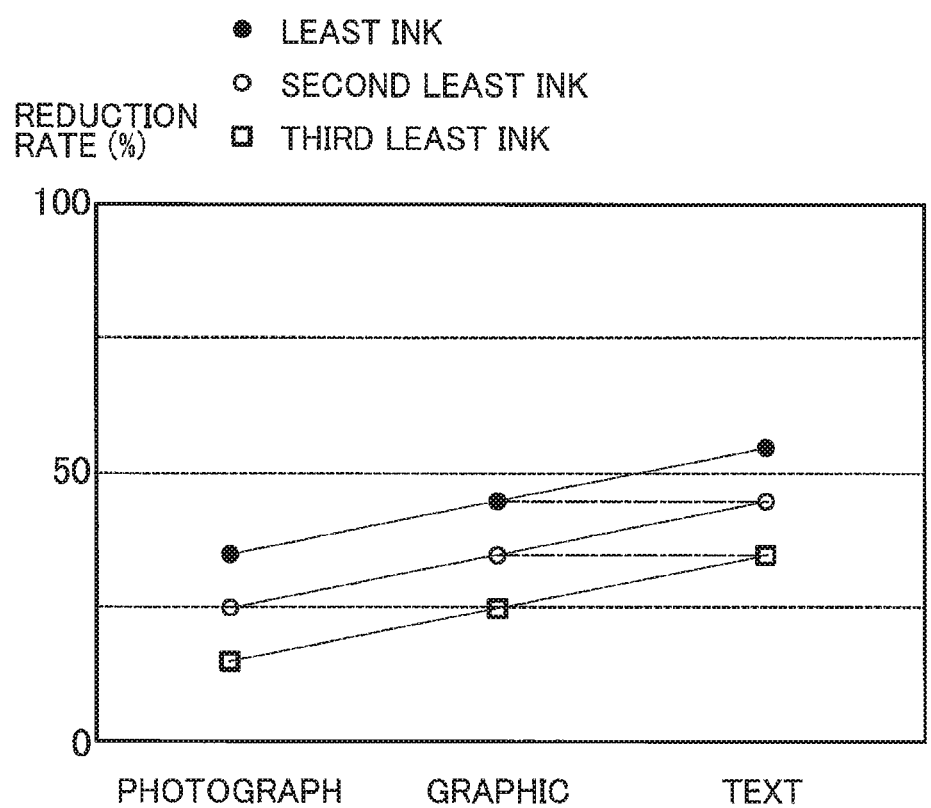

IMAGE PROCESSING APPARATUS FOR PERFORMING REDUCTION PROCESS TO REDUCE AMOUNT OF SPECIFIC COLOR MATERIAL TO BE USED

CROSS REFERENCE TO RELATED APPLICATION

This application claims priority from Japanese Patent Application No. 2016-129834 filed Jun. 30, 2016. The entire content of the priority application is incorporated herein by reference.

TECHNICAL FIELD

The present disclosure relates an image processing for printing.

BACKGROUND

A technique for performing color correction on print data when printing is performed by using a plurality of types of toners so that the remaining amounts of the toners become uniform among the plurality of types of toners is known. For example, in the technique, if the remaining amounts of magenta toner and cyan toner are detected to be small, color correction is performed to suppress the use of the magenta toner and cyan toner.

SUMMARY

However, according to the foregoing technique, because color materials having small remaining amounts are suppressed from being used, there is a possibility that the appearance of the printed image deteriorates.

In view of the foregoing, the object of the present disclosure is to provide a technique that can suppress deterioration in the appearance of the printed image while suppressing the amounts of color materials having small remaining amounts from being used.

In order to attain the above and other objects, the disclosure provides an image processing apparatus. The image processing apparatus includes a controller configured to perform: acquiring target image data representing a target image including a plurality of types of objects, the plurality of types of objects including a first type of object having a first attribute, and a second type of object having a second attribute different from the first attribute; acquiring remaining amount information regarding a remaining amount of each of a plurality of types of color materials used for printing the target image, the plurality of types of color materials having a first type of color material and a second type of color material different from the first type of color material; specifying the first type of object among the plurality of types of objects; specifying, as a specific type of color material, one of the first type of color material and a second type of color material, remaining amount of the specific type of color material being smaller than that of remaining one of the first type of color material and the second type of color material; determining a first reduction index value, the first reduction index value indicating a first degree of reduction in an amount of the specific type of color material to be used when the first type of object is printed; and creating processed data by performing a reduction process on the target image data, the reduction process reducing an amount of the specific type of color material to be used in printing the first type of object on the basis of the first reduction index value such that an amount of the specific type of color material to be used when printing the first type of object with performing the reduction process is reduced as compared with an amount of the specific type of color material to be used when printing the first type of object without performing the reduction process, wherein an amount of the specific type of color material to be used in printing the second type of object is not reduced on the basis of the first reduction index value.

According to another aspects, the disclosure provides a non-transitory computer readable storage medium storing a set of program instructions installed on and executed by a computer. The set of program instructions includes: acquiring target image data representing a target image including a plurality of types of objects, the plurality of types of objects including a first type of object having a first attribute, and a second type of object having a second attribute different from the first attribute; acquiring remaining amount information regarding a remaining amount of each of a plurality of types of color materials used for printing the target image, the plurality of types of color materials having a first type of color material and a second type of color material different from the first type of color material; specifying the first type of object among the plurality of types of objects; specifying, as a specific type of color material, one of the first type of color material and a second type of color material, remaining amount of the specific type of color material being smaller than that of remaining one of the first type of color material and the second type of color material; determining a first reduction index value, the first reduction index value indicating a first degree of reduction in an amount of the specific type of color material to be used when the first type of object is printed; and creating processed data by performing a reduction process on the target image data, the reduction process reducing an amount of the specific type of color material to be used in printing the first type of object on the basis of the first reduction index value such that an amount of the specific type of color material to be used when printing the first type of object with performing the reduction process is reduced as compared with an amount of the specific type of color material to be used when printing the first type of object without performing the reduction process, wherein an amount of the specific type of color material to be used in printing the second type of object is not reduced on the basis of the first reduction index value.

BRIEF DESCRIPTION OF THE DRAWINGS

The particular features and advantages of the disclosure as well as other objects will become apparent from the following description taken in connection with the accompanying drawings, in which:

FIG. 1 is an explanatory diagram illustrating a multifunction peripheral according to a first embodiment;

FIG. 2 is a diagram illustrating an example of an ink remaining amount table;

FIG. 7 is a chart illustrating reduction rates of inks for respective types of objects.

DETAILED DESCRIPTION

A. First Embodiment

Figure 3:
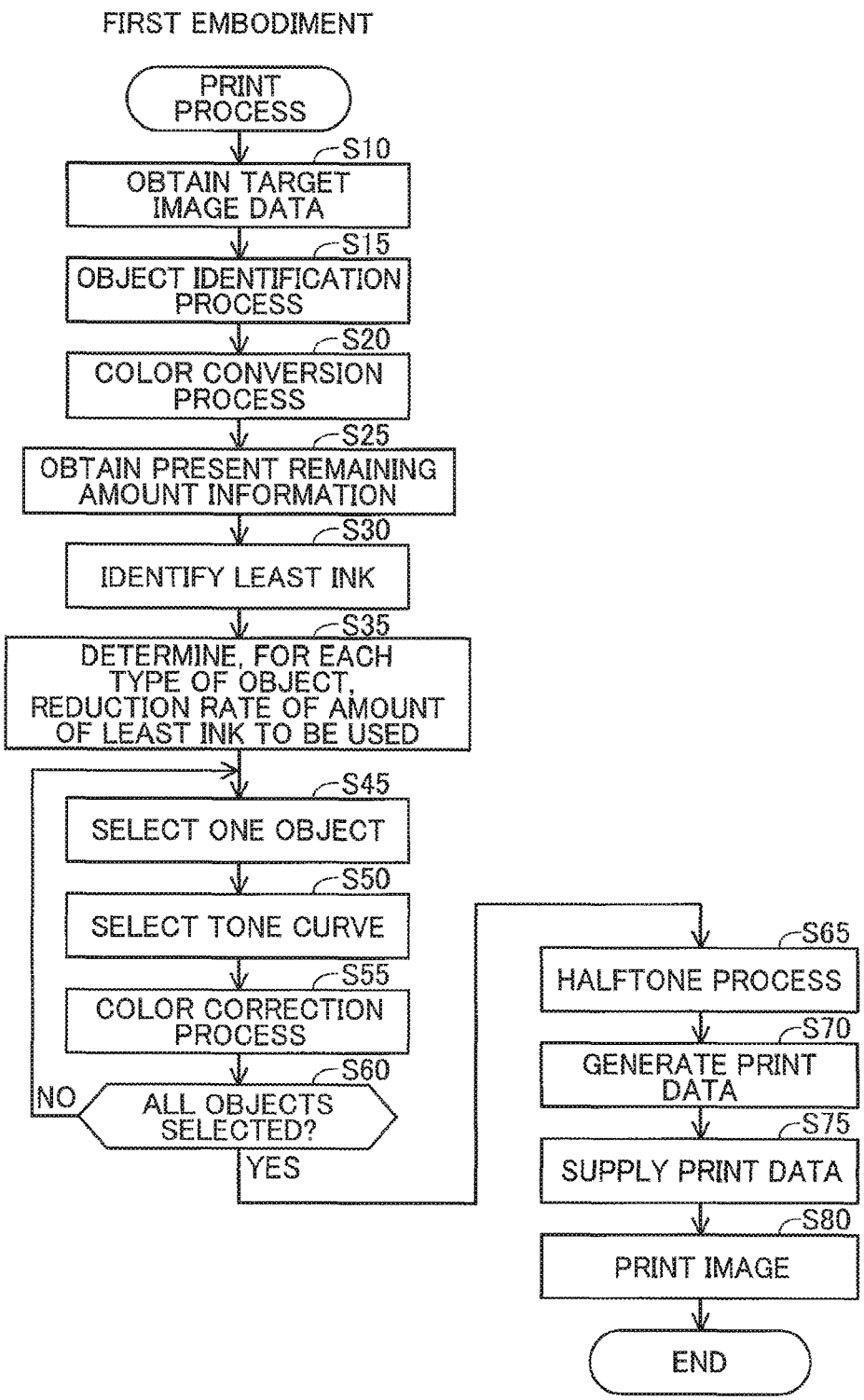
FIG. 3 is a flowchart illustrating a print process according to the first embodiment.

FIG. 1 is an explanatory diagram illustrating a multifunction peripheral 200 according to an embodiment. The multifunction peripheral 200 includes a controller 202, a scanner 280, and a printer 290. The controller 202 includes a CPU 210, a volatile storage 220, a nonvolatile storage 230, a display 240, an operation interface 250, and a communication interface 270. Such components are connected to each other via a bus.

The printer 290 is an apparatus which prints an image on a sheet (an example of a printing medium) by a predetermined method (for example, a laser method or an inkjet method). In the present embodiment, the printer 290 is an inkjet printer which prints a color image by using a plurality of types of inks (specifically, four types of inks cyan C, magenta M, yellow Y, and black K) as color materials. As a modification, only three types of inks C, M, and Y may be used. One or more other types of inks (such as light cyan (LC) and light magenta (LM)) may be used in addition to C, M, Y, and K. The printer 290 may be a printing apparatus of other methods. For example, the printer 290 may be a laser printer which prints an image by using a plurality of types of toners as color materials.

The plurality of types of inks are accommodated in respective different ink cartridges. The inks are supplied from the ink cartridges to the printer 290. When one type of ink in the ink cartridge is consumed, and the remaining amount of the one type of ink falls below a reference level, the ink cartridge of the one type of ink needs to be replaced to new one for replenishing the one type of ink in order to further perform printing using the one type of ink.

The CPU 210 is an arithmetic device (processor) for performing data processing. An example of the volatile storage 220 is a DRAM. An example of the nonvolatile storage 230 is a flash memory.

The volatile storage 220 provides a buffer area for temporarily storing various types of intermediate data used by the CPU 210 in executing a program PG. The nonvolatile storage 230 stores the computer program PG and an ink remaining amount table RT.

The CPU 210 (or the controller 202) implements various functions as a controller of the multifunction peripheral 200 by executing the program PG. For example, the CPU 210 can perform a print process (details will be described later) for controlling the printer 290 to print an image by using target image data according to the user's instructions. The CPU 210 can drive the scanner 280 to optically read a target object and generate document data representing the target object according to the user's instructions.

In the embodiment, the program PG is previously stored as firmware in the nonvolatile storage 230 by the manufacturer of the multifunction peripheral 200. The multifunction peripheral 200 may be configured so that at least part of the program PG is obtained from outside and stored into the nonvolatile storage 230. For example, the program PG may be provided to be downloaded from a server connected via the Internet, or may be provided from an external storage such as a CD-ROM so as to be installed on the multifunction peripheral 200 from the external storage.

FIG. 2 is a diagram illustrating an example of the ink remaining amount table RT. The ink remaining amount table RT of FIG. 2 includes remaining amount information indicating the remaining amounts of respective ones of the plurality of types of inks. Specifically, the ink remaining amount table RT includes values Rc, Rm, Ry, and Rk specifying the remaining amounts of the C, M, Y, and K inks, respectively. For example, the CPU 210 obtains the remaining amounts Rc, Rm, Ry, and Rk of the inks and updates the ink remaining amount table RT at prescribed periods or each time printing is performed. Each of the remaining amounts Rc, Rm, Ry, and Rk of the inks is obtained by calculating the cumulative value of the amount of the ink that has been consumed by printing, and subtracting the cumulative value from the initial value of the amount of the ink at a timing when the corresponding ink cartridge is replaced. In a modification, the remaining amounts Rc, Rm, Ry, and Rk of the inks may be obtained by detection, using known ink remaining amount sensors attached to the ink cartridges accommodating the corresponding inks.

The display 240 is a device for displaying images such as a user interface screen (UI screen). An example of the display 240 is a liquid crystal display. The operation interface 250 is a device for receiving operations made by the user. Examples include buttons and a touch panel arranged on the display 240. The user can operate the operation interface 250 to input various instructions to the multifunction peripheral 200.

The communication interface 270 is an interface for communicating with other apparatuses. Examples of the communication interface 270 include a USB interface, a wired LAN interface, and an IEEE 802.11 wireless interface.

The scanner 280 optically reads a target object, such as a document, by using a photoelectric conversion element, such as a CCD and a CMOS, to generate scan data representing the read image.

FIG. 3 is a flowchart of the print process according to the first embodiment. This print process is started, for example, when the user inputs a print instruction to the operation interface 250. In the embodiment, the print instruction includes an instruction for specifying target image data to be used for the printing and an instruction for specifying the number of sheets to be printed. The target image data may be stored in an arbitrary storage. For example, data stored in the nonvolatile storage 230 may be specified as the target image data. Data stored in an external device (such as a removable memory) connected to the communication interface 270 may be specified as the target image data.

Figure 4:
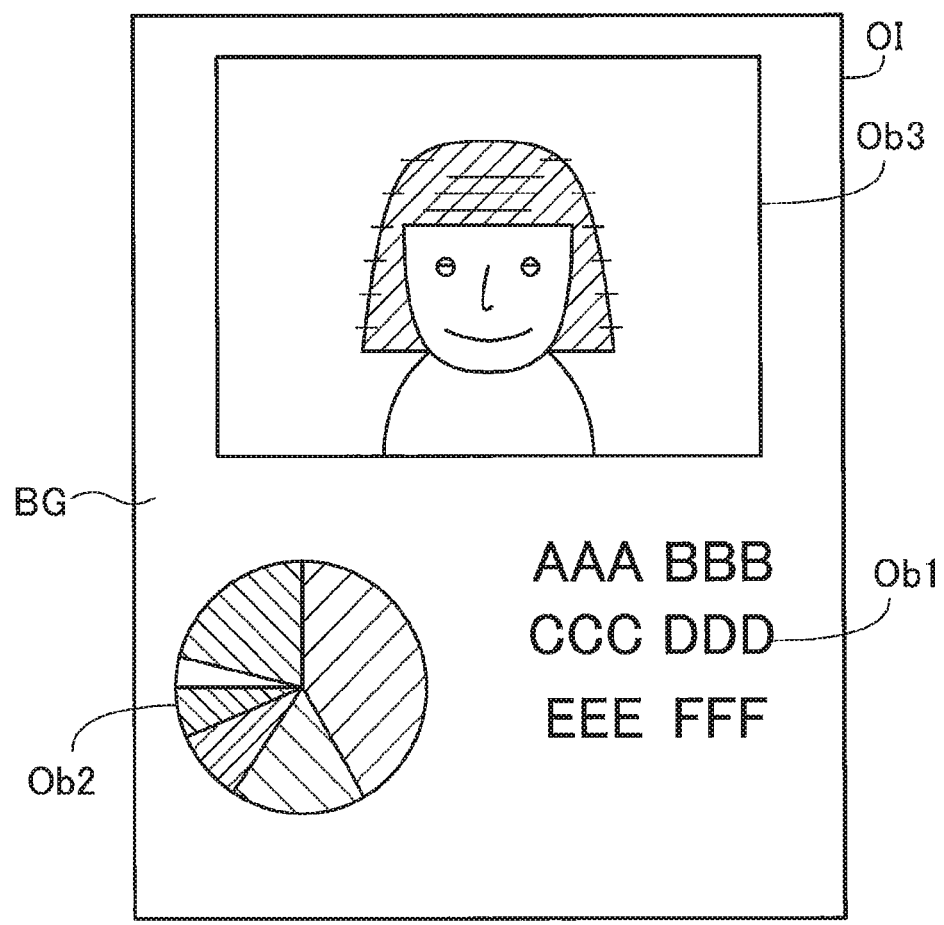
FIG. 4 is an explanatory diagram illustrating an example of a target image represented by target image data.

In S10, the CPU 210 obtains the target image data specified by the print instruction. FIG. 4 is a diagram illustrating an example of a target image OI represented by the target image data. The target image OI of FIG. 4 includes a background BG and a plurality of objects, specifically objects Ob1, Ob2, Ob3. The plurality of objects includes a plurality of types of objects having respective attributes different from each other, namely, text Ob1, a graphic Ob2, and a photograph Ob3. Examples of the graphic Ob2 include objects such as an illustration, a table, a graph, a diagram, vector graphics, and a pattern.

In the embodiment, the target image data is bitmap data including a plurality of pixels. The target image data is RGB image data representing the color of each pixel in RGB values. The RGB values of a pixel include gradation values (for example, 256-level gradation values) of three color components, red (R), green (G), and blue (B). In a modification, the target image data may be image data written in a predetermined description language (also referred to as vector data). Examples of the predetermined description language include ones provided by an operating system (hereinafter, abbreviated as OS) of a computer, such as a description language according to the GDI (an abbreviation of Graphics Device Interface) specifications of Windows (resisted trademark) from Microsoft Corporation. Alternatively, the target image data may be described by using PCL (an abbreviation of Printer Control Language) or a page description language such as PostScript.

In S15, the CPU 210 performs an object identification process on the target image data. The object identification process is for identifying areas (also referred to as object areas) of the target image OI image in which the plurality of objects Ob1 to Ob3 are arranged, and identifying the attributes of the objects in the respective object areas. In the embodiment, the attribute of an object is any one of a photograph, text, and a graphic.

In the object identification process, the CPU 210 applies a known edge detection filter to the target image data to extract edges in the object image OI, for example. The CPU 210 identifies, as an object area, an area in which the amount of edges is greater than a reference level. The CPU 210 identifies an area having the characteristics of text as text among the one or more object areas identified. The CPU 210 identifies an area having the characteristics of a photograph as a photograph. The CPU 210 identifies an area having neither the characteristics of text nor those of a photograph as a graphic among the one or more object areas. Examples of the characteristics of text include that the number of colors is smaller than a threshold value TH1 and that the ratio of object pixels having color different from the background color is lower than a threshold value TH2. Examples of the characteristics of a photograph include that the number of colors is greater than the threshold value TH1 and that the ratio of pixels having color different from the background color is higher than the threshold value TH2. The object identification process may employ various known techniques. Examples of the known techniques include those disclosed in Japanese Patent Application Publications No. 2013-030090 (corresponding to U.S. Pat. No. 8,837,836), Japanese Patent Application Publications No. H5-225378, and Japanese Patent Application Publications No. 2002-288589.

When the target image data is vector data, the target image data includes a plurality of drawing commands for defining the objects Ob1 to Ob3. Such drawing commands have different information depending on the type of the object to be defined. For example, drawing commands for the text Ob1 include text code, information for defining the attributes of the text, and coordinate information. The information for defining the attributes of the text includes a font type, color, and size. The coordinate information specifies an arrangement position. Drawing commands for the graphic Ob2 include, for example, vectors representing lines and figures, information for defining attributes, and coordinate information. The information for defining the attributes includes types of the lines and figures, color, and size. The coordinate information specifies an arrangement position. Drawing commands for the photograph Ob3 include, for example, raster data such as JPEG image data, information for defining the attributes of the photograph, and coordinate information. The information for defining the attributes of the photograph includes a size and the color space used. The coordinate information specifies an arrangement position. When the target image data is vector data, the CPU 210 may therefore refer to the drawing commands included in the target image data to identify the object areas and the attributes of the objects.

In S20, the CPU 210 performs a color conversion process on the target image data to generate CMYK image data. The CMYK image data represents the color of each pixel in CMYK values. The CMYK values include a plurality of types of component values corresponding to the plurality of types of inks (C: cyan, M: magenta, Y: yellow, and K: black) used in the printer 290. For example, the component values of the CMYK values are 256-level gradation values. The color conversion process is performed by using an unillustrated lookup table which defines the correspondence between the RGB gradation values and the CMYK gradation values. When the target image data is vector data, the CPU 210 performs a rasterization process on the vector data to generate RGB image data. The CPU 210 then performs the color conversion process on the RGB image data to generate CMYK image data.

In S25, the CPU 210 obtains remaining amount information indicating the current remaining amounts of respective ones of the plurality of types of inks. Specifically, the CPU 210 obtains the remaining amounts Rc, Rm, Ry, and Rk of the inks as the remaining amount information from the ink remaining amount table RT (FIG. 2) stored in the memory (nonvolatile storage 230). The CPU 210 stores the obtained remaining amount information in the buffer area (volatile storage 220). The current remaining amounts Rc, Rm, Ry, and Rk of the inks can be said to be pre-printing remaining amount information indicating the remaining amounts of the plurality of types of inks before the target image OI is printed.

In S30, the CPU 210 identifies a least ink on the basis of the remaining amounts Rc, Rm, Ry, and Rk of the inks obtained in S25. The least ink indicates the ink whose remaining amount is the smallest among the plurality of types of inks (C, M, Y, and K inks) in the printer 290.

In S35, the CPU 210 determines a reduction rate of the amount of the least ink that is used for printing the target image OI for each type of object. For example, in a case where the least ink identified in S30 is the Y ink, the CPU 210 determines a reduction rate PDy of the Y ink for printing a photograph, a reduction rate TDy of the Y ink for printing text, and a reduction rate GDy of the Y ink for printing a graphic. The reduction rates PDy, TDy, and GDy of the Y ink are values indicating the degrees by which the amount of the Y ink to be used is reduced for printing the corresponding objects.

In the embodiment, the reduction rates PDy, TDy, and GDy of the Y ink are determined to be reduction rates PD, TD, and GD which are previously defined for the respective types of objects. The reduction rate TD for text is the highest. The reduction rate GD for a graphic is the second highest. The reduction rate PD for a photograph is the lowest. For example, the reduction rate TD for text, the reduction rate GD for a graphic, and the reduction rate PD for a photograph are defined as 50%, 40%, and 30%, respectively. For example, the reduction rate TD is predetermined as follows. That is, sample images showing text are printed at various reduction rates. The image qualities of the printed sample images are then visually evaluated. The maximum reduction rate at which the image quality is visually evaluated to be allowable is previously determined to be the reduction rate TD for text. The reduction rate GD for a graphic and the reduction rate PD for a photograph are predetermined in the same manner.

In S45 to S60, the CPU 210 performs an ink amount reduction process for reducing the amounts of the least ink to be used for printing the target image OI.

In S45, the CPU 210 selects one object to be processed, as a target object, from the plurality of objects Ob1 to Ob3 in the target image OI.

In S50, the CPU 210 selects a tone curve according to the type of the target object.

Figure 5A:
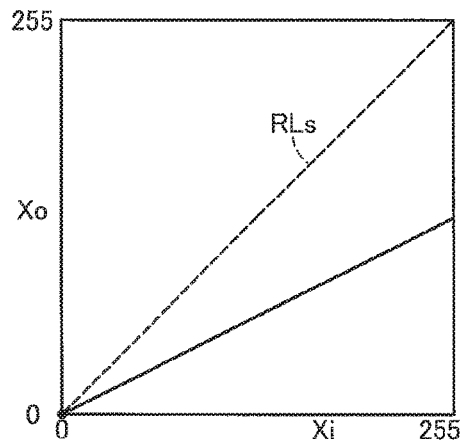
FIGS. 5A to 5C are graphs showing examples of tone curves.
Figure 5B:
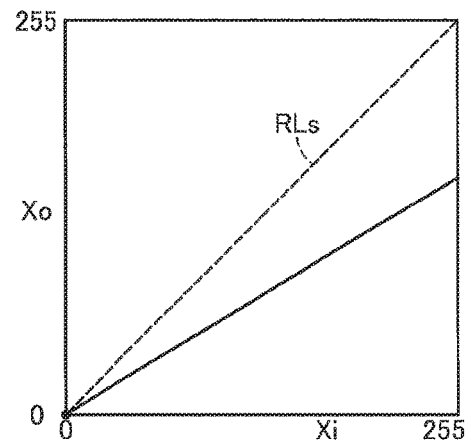
Figure 5C:
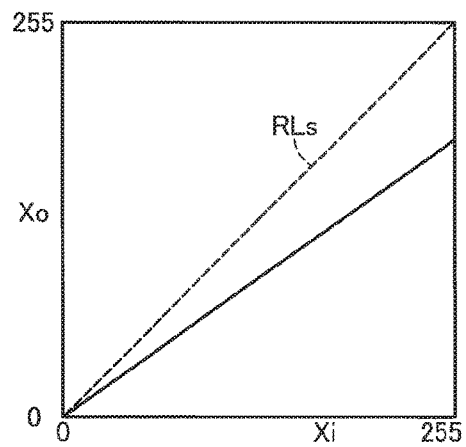

FIGS. 5A to 5C are graphs showing examples of tone curves. For example, when the target object is the text Ob1, the CPU 210 selects a tone curve for text (FIG. 5A) with a reduction rate PD=50%. When the target object is the graphic Ob2, the CPU 210 selects a tone curve for a graphic (FIG. 5B) with a reduction rate PD=40%. When the target object is the photograph Ob3, the CPU 210 selects a tone curve for a photograph (FIG. 5C) with a reduction rate PD=30%.

In each of the tone curves of FIGS. 5A to 5C, the horizontal axis represents an input value Xi which can vary within the range of 0 to 255. The vertical axis represents an output value Xo. The broken line RLs in the chart is a line representing a relation between the input value Xi and the output value Xo without a change in the gradation value. In other words, the broken line RLs represents the correspondence of Xo=Xi across the entire range of the input value Xi. The solid line in the diagram represents the tone curve.

Each tone curve shows the relation between the input value Xi and the output value Xo. In the present embodiment, the tone curve with a reduction rate of M % (M is a value satisfying 0<M<100) is a line that associates a minimum value "0" of the input value Xi with a minimum value "0" of the output value Xo, and a maximum value "255" of the input value Xi with a maximum value "255×{(100−M)/100}" of the output value Xo. In other words, the tone curve with the reduction rate of M % associates the input value Xi with a value obtained by reducing the input value Xi by M % (a (100−M) % value of the input value Xi) as the output value Xo. That is, according to the tone curve, the Xo is obtained as follows: Xo=Xi×(100−M)/100).

In S55, the CPU 210 performs a color correction process by using the tone curve selected in S50. Specifically, the CPU 210 extracts partial image data expressing the target object from the CMYK image data generated by the color conversion process in S20. The CPU 210 changes the component value corresponding to the least ink among the CMYK values of each pixel included in the partial image data by using the selected tone curve. The rest of the CMYK image data other than the partial image data expressing the target object is not changed. The component values corresponding to the inks other than the least ink among the CMYK values of each pixel included in the partial image data are not changed For example, when the least ink is the Y ink and the target object is the graphic Ob2 (FIG. 4), only the Y component value among the CMYK values of each pixel included in the partial image data expressing the graphic Ob2 is changed by using the tone curve for a graphic (FIG. 5B).

The CMYK component values specify the densities of the respective components of the corresponding pixel. The greater the CMYK component values are, the greater the amounts of the inks used in printing the corresponding pixel. To change the value of one of the CMYK component values (for example, Y component value) to a value reduced by M % (the reduction rate) indicates that the consumption amount of the ink (for example, Y ink) corresponding to the component value is reduced by M % (the reduction rate) thereof when the target object is printed afterward compared to a case where the ink amount reduction process is not performed. That is, in the reduction process, an amount of a specific ink (yellow ink), which has a least amount among all the inks, to be used when printing the text object(s) is reduced as compared with an amount of the specific ink to be used when printing the text object(s) without performing the reduction process on the basis of the reduction rate (50%) for the text object. Further, in the reduction process, an amount of the specific ink to be used in printing the graphic object or the photograph object is not reduced on the basis of the reduction rate for the text object (50%), but reduced on the basis of the reduction rate for corresponding one of the graphic object and the photograph object (40% or 30%).

In S60, the CPU 210 determines whether all the objects in the target image OI have been selected as the target object. When there is an unselected object or objects (S60: YES), the CPU 210 returns to S45. When all the objects have been selected (S60: NO), the CPU 210 advances to S65.

In S65, the CPU 210 performs a halftone process on the CMYK image data corrected through the processes S45 to S60. The CPU 210 thereby generates dot data which represents the dot formation state with respect to each pixel and with respect to each ink type. In the embodiment, the halftone process is performed by an error diffusion process using an error matrix. Alternatively, the halftone process using a dither matrix may be employed. The dot formation state includes, for example, the presence or absence of a dot and the size of the dot.

In S70, the CPU 210 generates print data by using the dot data. The print data is data represented in a predetermined data format for controlling the printer 290. For example, the CPU 210 arranges the pieces of dot data in order of use during printing, and adds various printer control codes and data identification codes to generate the print data.

In S75, the CPU 210 supplies the printer 290 with the generated print data. In S80, the printer 290 prints an image according to the print data received, and the print process of FIG. 2 ends.

According to the print process of the first embodiment described above, the CPU 210 determines the reduction rates (for example, the reduction rates PDy, TDy, and GDy of the Y ink) indicating the degrees by which the amounts of a specific type of ink to be used (for example, Y ink) in printing the respective objects Ob1 to Ob3 are reduced (S30 and S35), on the basis of the remaining amount information obtained in S25. The CPU 210 performs the ink amount reduction process by using the reduction rates (S45 to S60). In the reduction process, the amount of the specific type of ink (for example, Y ink) to be used in printing the text Ob1 is reduced according to the reduction rate TDy for text (S50 and S55). In the reduction process, the amounts of the specific type of ink to be used in printing the graphic Ob2 and the photograph Ob3 are not reduced according to the reduction rate TDy for text, but reduced according to the reduction rate GDy for a graphic and the reduction rate PDy for a photograph, respectively (S50 and S55). Since the degree of reduction in the amount of the color material of the specific type of ink to be used can be changed according to the type of the object, deterioration of the appearance of the printed target image OI (also referred to as printed image) can be suppressed while suppressing the amount of the specific type of ink from being used.

When the amount of one ink (for example, the consumption amount of the Y ink) to be used is reduced, the density of the color of the ink decreases in the printed image. Consequently, as compared to a case where the amount of the one ink to be used is not reduced, the objects may decrease in color density and the objects may change in hue. When such phenomena occur, the degree of deterioration in appearance may vary depending on the type of the object for an observer observing the printed image. For example, the image quality of text is considered to depend more on the sharpness and the smoothness of edges than on the color reproducibility and gradations. On the other hand, the image quality of a photograph is considered to depend more on the color reproducibility and gradations than on the sharpness and smoothness of edges. The image quality of a graphic comes between that of text and that of a photograph. The levels of color reproducibility and gradations needed for a graphic are considered to be higher than those of text and lower than those of a photograph. A drop in density and a change in hue can significantly lower the color reproducibility and gradations, but do not impact on the sharpness and smoothness of edges. Due to such reasons, when the same level of density drop occurs for a photograph, a graphic, and text, or the same level of hue changes occur in the printed image for the photograph, the graphic, and the text, the degree of deterioration in the appearance of the printed image for the observer decreases in the order of the photograph, the graphic, and the text. Text needs readability rather than image quality. The observer is therefore more likely to tolerate decreases in density and changes in hue as long as the readability is not degraded.

From the foregoing, as in the embodiment, the reduction rate of a specific type of ink (for example, Y ink) can be changed according to the type of the object to suppress deterioration in the appearance of the printed image while suppressing the amount of the specific type of ink from being used. Specifically, the reduction rate TDy for text is made higher than the reduction rates PDy and GDy for a photograph and a graphic. The reduction rate GDy for a graphic is made higher than the reduction rate PDy for a photograph. Deterioration in the appearance of the printed image can thus be suppressed as compared to a case where one reduction rate is applied to the entire image.

More specifically, the CPU 210 determines that the least ink having the smallest remaining amount among the plurality of types of inks is the specific type of ink for reducing the amount to be used (S30), on the basis of the remaining amount information obtained in S25. The CPU 210 determines the reduction rates (for example, the reduction rates PDy, TDy, and GDy of the Y ink) indicating the degrees by which the amounts of the least ink (for example, Y ink) to be used in printing the respective objects Ob1 to Ob3 are reduced (S35). As a result, the amount of the least ink to be used during printing can be appropriately suppressed to adjust the remaining amount of the ink after the printing.

For example, when the amount of the least ink to be used is suppressed each time printing is performed, the remaining amounts of the respective plurality of types of inks can be appropriately adjusted so that the remaining amounts of the inks become as equal as possible. This can reduce the user's burden. The reason why the user's burden is reduced will be described as follows.

That is, for example, in a case where the timing when the ink needs to be replenished due to shortage of the remaining amount of ink below a reference value varies greatly from one type of ink to another, the timings of replenishment are dispersed for types of inks. Thus, the user needs to replenish different types of inks frequently. This makes a relatively long period, in which no ink needs to be replenished, hardly occur. As a result, the user's burden can increase. On the other hand, if the remaining amounts of the inks are adjusted as in the print process of the first embodiment, the timings when the respective types of inks need to be replenished (in the embodiment, the timing when the ink cartridges are replaced) are likely to come at roughly the same time. Since the timings to replenish the plurality of types of inks concentrates in a short period, the plurality of types of inks are easier to replenish at a time. Since the replenishment of the plurality of types of inks is performed within a relatively short period in a concentrated manner, the inks do not need to be replenished for a relatively long period after all the types of inks are replenished within a relatively short period of time. A relatively long period in which no ink needs to be replenished is therefore likely to occur. As a result, the user's burden can be reduced.

According to the print process of the first embodiment, the CPU 210 determines the reduction rate GDy which specifies the degree by which the amount of the specific type of ink to be used in printing the graphic Ob2 is reduced (S35). The degree (for example, 40%), by which the amount of the specific type of ink to be used is reduced and which is specified by the reduction rate GDy for a graphic, is smaller than the degree (for example, 50%), by which the amount of the specific type of ink to be used is reduced and which is specified by the reduction rate TDy for text. Similarly, the CPU 210 determines the reduction rate PDy which specifies the degree by which the amount of the specific type of the ink to be used in printing the photograph Ob3 is reduced (S35). The degree (for example, 30%), by which the amount of the specific type of ink to be used is reduced and which is specified by the reduction rate PDy for a photograph, is smaller than the degree (for example, 50%), by which the amount of the specific type of ink to be used is reduced and which is specified by the reduction rate TDy for text. Appropriate reduction rates can thus be determined for the text Ob1 as well as for the graphic Ob2 and the photograph Ob3 which are likely to deteriorate in image quality compared with text if the specific type of ink is reduced. As a result, the amounts of the specific type of ink to be used in printing the text Ob1, the graphic Ob2, and the photograph Ob3 can be appropriately reduced. Deterioration in the appearance of the printed image can thus be more effectively suppressed.

According to the print process of the first embodiment, the CPU 210 determines the three types of reduction rates TDy, GDy, and PDy so that the degree, by which the amount of the specific type of ink (for example, Y ink) to be used is reduced, increases in order previously determined for the plurality of types of objects. In the embodiment, the CPU 210 determines the three types of reduction rates TDy, GDy, and PDy so that the degree increases in the order of a photograph, a graphic, and text (S35). Appropriate reduction rates according to the characteristics of the foregoing objects can thus be determined with respect to each of the plurality of types of objects. As a result, the amount of the specific type of color material to be used can be appropriately reduced for each of the plurality of types of objects. Deterioration in the appearance of the printed image can thus be more effectively suppressed.

In the first embodiment, Y ink is an example of a first type color material, C ink is an example of a second type color material. CMYK image data after performing the reduction process in S45-S65 is an example of a processed data. A text Ob1 is an example of a first type object, a graphic OB2 is an example of a second type object. A reduction rate TDy is an example of a first reduction index value, a reduction rate GDy is an example of a second reduction index value.

B. Second Embodiment

Figure 6:
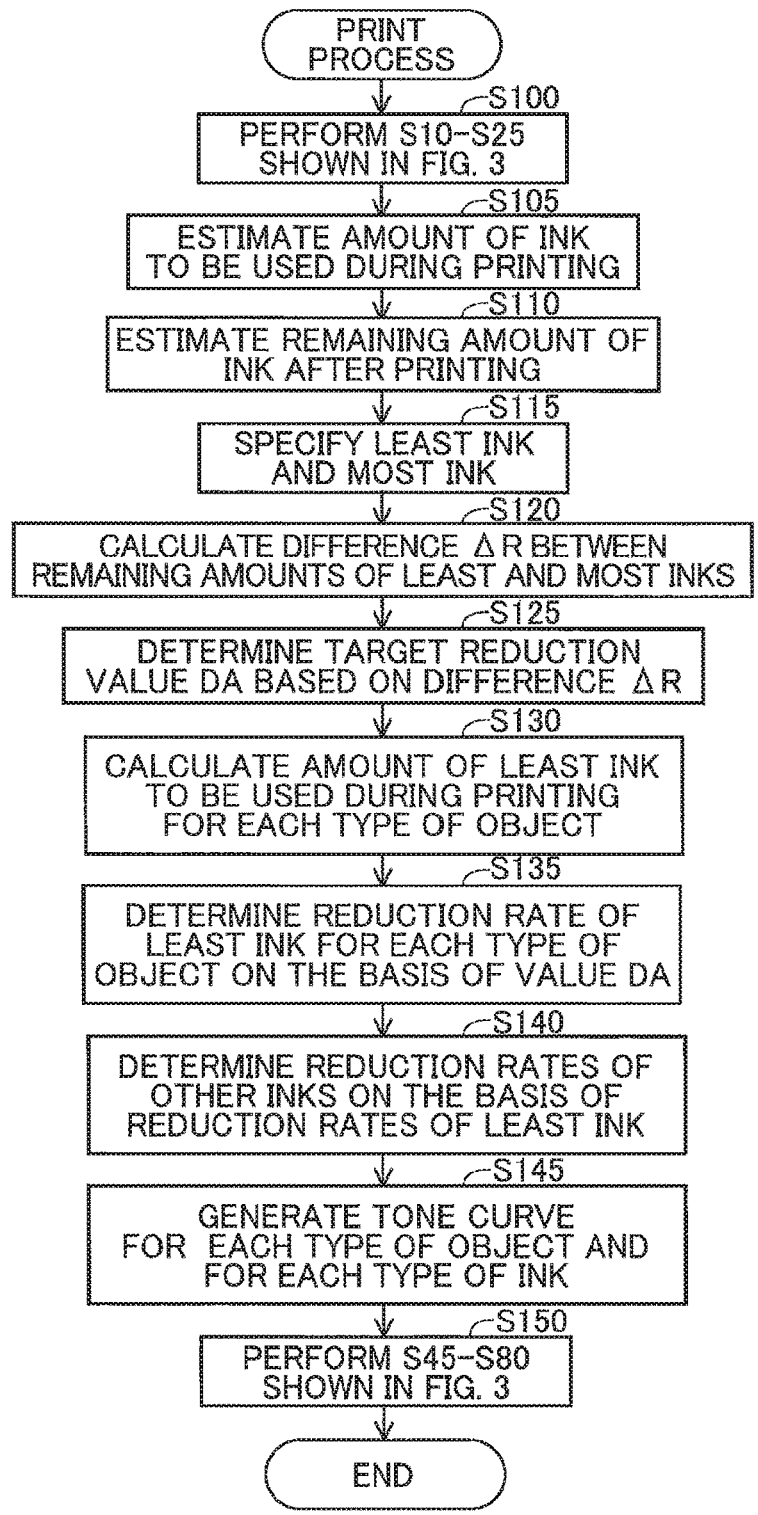
FIG. 6 is a flowchart illustrating a print process according to a second embodiment.

FIG. 6 is a flowchart illustrating a print process according to a second embodiment. In S100 of FIG. 6, the CPU 210 performs the processes S10-S25 shown in FIG. 3.

In S105, the CPU 210 calculates (or estimates) the amount of ink to be used during printing for each of the plurality of types of inks. The amount of ink to be used during printing indicates the amount of the ink estimated to be used on the assumption that the target image OI is printed by using the target image data without performing the reduction process. Specifically, the CPU 210 performs the halftone process on the CMYK image data to generate dot data. The CPU 210 counts the number of dots to be formed for each of the inks C, M, Y, and K on the basis of the dot data. The CPU 201 calculates amounts Clc, Clm, Cly, and Clk to be used for a single target image on the basis of the numbers of dots to be formed. The CPU 210 multiplies amounts Clc, Clm, Cly, and Clk to be used for a single target image by the number of sheets to be printed P (P is an integer greater than or equal to 1), to calculate (or estimate) amounts Cc, Cm, Cy, and Ck of the inks to be used during printing. That is, the amounts Cc, Cm, Cy, and Ck are calculates as follows, Cc=(P×Clc), Cm=(P×Clm), Cy=(P×Cly), and Ck=(P×Clk). The CPU 210 may obtain the amounts Clc, Clm, Cly, and Clk on the basis of the dot formation state of each pixel in the dot data.

In S110, the CPU 210 calculates the remaining amounts of the respective plurality of types of inks after the printing on the basis of the current remaining amounts Rc, Rm, Ry, and Rk of the inks obtained in S25 and the amounts Cc, Cm, Cy, and Ck of the inks to be used during printing which are obtained in S105. Specifically, the CPU 210 subtracts the amounts Cc, Cm, Cy, and Ck of the inks C, M, Y, and K to be used during printing from the current remaining amounts Rc, Rm, Ry, and Rk of the inks respectively, and then obtains remaining amounts Rpc, Rpm, Rpy, and Rpk of the inks after the printing. That is, Rpc=(Rc−Cc), Rpm=(Rm−Cm), Rpy=(Ry−Cy), and Rpk=(Rk−Ck). The remaining amounts Rpc, Rpm, Rpy, and Rpk of the inks after the printing can be said to be post-printing remaining amount information indicating the remaining amounts of the plurality of types of inks estimated on the assumption that the target image OI is printed without performing the reduction process.

In S115, the CPU 210 determines a least ink and a most ink among the plurality of types of inks on the basis of the remaining amounts Rpc, Rpm, Rpy, and Rpk of the inks after the printing. The least ink indicates an ink whose remaining amount after the printing is the smallest among the plurality of types of inks. The most ink indicates an ink whose remaining amount after the printing is the largest among the plurality of types of inks.

In S120, the CPU 210 calculates a difference ΔR between the remaining amounts of the least ink and the most ink. For example, when the least ink is the Y ink and the most ink is the M ink, ΔR=(Rpm−Rpy).

In S125, the CPU 210 determines a target reduction value DA of the least ink on the basis of the difference ΔR. For example, the target reduction value DA is determined by multiplying the difference ΔR by a prescribed coefficient Q (DA=(Q×ΔR)). In the embodiment, the coefficient Q is (⅔).

In S130, the CPU 210 calculates the amount of the least ink to be used during printing for each type of object. For example, when the least ink is the Y ink, the CPU 210 calculates amounts Cy_Ob1, Cy_Ob2, and Cy_Ob3 of the Y ink to be used for the text Ob1, the graphic Ob2, and the photograph Ob3 in the target image OI, respectively. For example, the number of dots of the Y ink to be formed in the area of the text Ob1 is counted by using the above described dot data. Based on the number of dots to be formed, the amount Cy_Ob1 of the Y ink to be used for the text Ob1 is calculated. If the target image OI includes the plurality of text objects for example, the CPU 210 may sum the amounts of the ink to be used for all the plurality of text objects for calculating the amount of the least ink to be used during printing for text type of objects. Similar summing processes may be performed when the target image OI includes the plurality of graphic objects or when the target image OI includes the plurality of photograph objects. The CPU 210 may obtain the amount of the least ink to be used during printing on the basis of the dot formation state of each pixel in the dot data.

In S135, the CPU 210 determines the reduction rate of the least ink for each type of object on the basis of the target reduction value DA. For example, when the Y ink is the least ink, the CPU 210 determines the reduction rate TDy of the Y ink for text, the reduction rate GDy for a graphic, and the reduction rate PDy for a photograph. In the embodiment, a relationship among the reduction rate TDy for text, the reduction rate GDy for a graphic, and the reduction rate PDy for a photograph is defined in advance so that the degree by which the amount of the Y ink to be used is reduced increases in the predetermined order of a photograph, a graphic, and text. For example, in the embodiment, a difference between the reduction rate TDy for text and the reduction rate GDy for a graphic and a difference between the reduction rate GDy for a graphic and the reduction rate PDy for a photograph are defined to be a prescribed value ΔV (for example, 10%). The reduction rate GDy for a graphic is given by GDy=(TDy−ΔV). The reduction rate PDy for a photograph is given by PDy=(TDy−2×ΔV).

Using the amounts Cy_Ob1, Cy_Ob2, and Cy_Ob3 of the Y ink to be used for the respective types of objects, which are calculated in S130, a reduction amount D1y of the Y ink for a target image OI (or a sheet) is expressed by the following equation (1).

$$D1y=(Cy\_Ob1 \times TDy/100)+\{Cy\_Ob2 \times (TDy-\Delta V)/100\}+\{Cy\_Ob3 \times (TDy-2\times\Delta V)/100\} \quad (1)$$

A reduction amount Dy of the Y ink in printing is given by multiplying the reduction amount D1y of the Y ink per sheet by the number of sheets to be printed P (Dy=P×D1y). The CPU 210 calculates the reduction rate TDy for text so that the reduction amount Dy of the Y ink in printing equals to the target reduction value DA. If the calculated reduction rate TDy for text does not exceed a predetermined upper limit value (for example, 60%), the CPU 210 determines the reduction rate TDy for text to be the calculated value. If the calculated reduction rate TDy exceeds the predetermined upper limit value, the CPU 210 determines the reduction rate TDy for text to be the predetermined upper limit value.

After the reduction rate TDy for text is determined, the CPU 210 calculates the reduction rate GDy for a graphic and the reduction rate PDy for a photograph on the basis of the reduction rate TDy for text. That is, GDy=(TDy−ΔV) and PDy=(TDy−2×ΔV).

FIG. 7 is a chart illustrating the reduction rates of the inks for the respective types of objects. In FIG. 7, black circles represent the reduction rates of the least ink. White circles represent the reduction rates of the ink whose remaining amount after the printing is the second smallest. Squares represent the reduction rates of the ink whose remaining amount after the printing is the third smallest. In the foregoing S135, the CPU 210 determines the reduction rates of the least ink (for example, Y ink) represented by the black circles in FIG. 7 for the respective types of objects.

In S140, the CPU 210 determines the reduction rates of the other inks for the respective types of objects on the basis of the reduction rates of the least ink. For example, the reduction rate of text for the ink whose remaining amount after the printing is the second smallest is determined to be the same as that of the graphic for the least ink. The reduction rate of text for the ink whose remaining amount after the printing is the third smallest is determined to be the same as that of the graphic for the second least ink (see FIG. 7).

Suppose, for example, that the Y ink is the least ink, the C ink is the ink whose remaining amount after the printing is the second smallest, the K ink is the ink whose remaining amount is the third smallest, and the M ink is the most ink whose remaining amount is the largest. In such a case, the reduction rate TDc of the C ink for text is determined to be the same as the reduction rate GDy of the Y ink for a graphic (TDc=GDy). The reduction rate GDc of the C ink for a graphic and the reduction rate PDc for a photograph are determined on the basis of the reduction rate TDc for text and the prescribed value ΔV similarly to the Y ink. That is, the rates PDc and TDc are given as follows, GDc=(TDc−ΔV) and PDc=(TDc−2×ΔV). The reduction rate TDk of the K ink for text is determined to be the same as the reduction rate GDc of the C ink for a graphic (TDk=GDc). The reduction rate GDk of the K ink for a graphic and the reduction rate PDk for a photograph are determined on the basis of the reduction rate TDk for text and the prescribed value ΔV. That is, the rates GDk and PDk are obtained by the following equations, GDk=(TDk−ΔV) and PDk=(TDk−2×ΔV).

In such a manner, according to the second embodiment, the reduction rates of each type of ink are determined to decrease in the order of text, a graphic, and a photograph (TDy>GDy>PDy, TDc>GDc>PDc, and TDk>GDk>PDk). For each type of object, the reduction rates are determined to decrease in ascending order of the remaining amount of the ink after the printing (TDy>TDc>TDk, GDy>GDc>GDk, and PDy>PDc>PDk). In other words, as the remaining amount of the ink is low, the corresponding reduction rate is high. In the embodiment, the most ink is excluded from target of the reduction process. No reduction rate is therefore determined for the most ink. In a modification, reduction rates may also be determined for the most ink. In this case, the reduction rate of the most ink for text may be the same as the reduction rate of the third smallest ink for graphic, and the reduction rates of the most ink for graphic and photograph may be determined according to the prescribed value ΔV similarly to other inks.

In S145, the CPU 210 generates a tone curve for each type of object and for each type of ink, on the basis of the determined reduction rates. In the embodiment, nine tone curves corresponding to the nine reduction rates TDy, GDy, PDy, TDc, GDc, PDc, TDk, GDk, and PDk are generated. The generated tone curves are similar to those used in the first embodiment (FIGS. 5A-5C). For example, a tone curve with a reduction rate of M % associates an input value Xi with a value obtained by reducing the input value Xi by M % (a (100−M) % value of the input value Xi) as an output value Xo.

In S150, the CPU 210 performs the processes S45 to S80 of FIG. 3. Accordingly, an image is printed. Unlike the first embodiment, in the reduction processes S45 to S60 of the second embodiment, a plurality of types of component values corresponding to the least ink, the second least ink, and the third least ink (for example, the Y, C, and K component values) are changed. For example, in the second embodiment, the Y, C, and K component values among the CMYK values of each pixel in each of the three types of partial image data expressing the three types of objects Ob1 to Ob3 are changed by using the respective tone curves.

According to the second embodiment described above, the CPU 210 determines the reduction rates (for example, the reduction rates PDy, TDy, and GDy of the Y ink) of the specific type of ink (for example, Y ink) for printing each of the objects Ob1 to Ob3 on the basis of the remaining amount information obtained in S110 (specifically, the remaining amounts of the inks after the printing) (S115 to S130). The CPU 210 performs the ink amount reduction process by using the reduction rates (S150). In the reduction process, the amount of the specific type of ink (for example, Y ink) to be used in printing the text Ob1 is reduced according to the reduction rate TDy for text. In the reduction process, the amounts of the specific type of ink to be used in printing the graphic Ob2 and the photograph Ob3 are not reduced according to the reduction rate TDy for text, but reduced according to the reduction rate GDy for a graphic and the reduction rate PDy for a photograph. As a result, the degree, by which the amount of the color material of the specific type of ink to be used is reduced, can be changed according to the type of object. Deterioration in the appearance of the printed target image OI (also referred to as printed image) can thus be suppressed while suppressing the amount of the specific type of ink to be used.

In the printing process of the second embodiment, the reduction rates GDy, GDc, and GDk for a graphic are lower than the respective reduction rates TDy, TDc, and TDk for text. Similarly, the reduction rates PDy, PDc, and PDk for a photograph are lower than the respective reduction rates TDy, TDc, and TDk for text. Appropriate reduction rates can thus be determined for the text Ob1 as well as for the graphic Ob2 and the photograph Ob3, which are likely to deteriorate in image quality compared with text if the specific type of ink is reduced. As a result, deterioration in the appearance of the printed image can be more effectively suppressed.

According to the print process of the second embodiment, the reduction rate TDy and the reduction rate TDc are determined (S140). Here, the reduction rate TDy specifies the degree by which the amount of the Y ink to be used in printing the text Ob1 is reduced, and the reduction rate TDc specifies the degree by which the amount of the C ink to be used in printing the text Ob1 is reduced. If the remaining amount of the Y ink after the printing is estimated smaller than that of the C ink after the printing, the degree, by which the amount of the C ink to be used is reduced and which is specified by the reduction rate TDc, is smaller than the degree, by which the amount of the Y ink to be used is reduced and which is specified by the reduction rate TDy. As a result, the amounts of the Y ink and the C ink to be used during printing can be appropriately reduced according to the remaining amounts of the inks. This allows more appropriate control of the remaining amounts of the inks after the printing.

According to the print process of the second embodiment, the CPU 210 determines a plurality of types of reduction rates (for example, TDy, TDc, and TDk) corresponding to a plurality of types of inks (for example, Y, C, and K) (S140). The plurality of types of reduction rates are determined so that the degree, by which the amount to be used in printing the text Ob1 is reduced, decreases in ascending order of the remaining amounts of the plurality of types of inks. As a result, the amounts of the plurality of types of inks to be used during printing can be appropriately reduced. This allows more appropriate control of the remaining amounts of the inks after the printing.

According to the print process of the second embodiment, the CPU 210 calculates the difference ΔR between the remaining amount of the most ink (for example, M ink) and that of the least ink (for example, Y ink) (S120). The CPU 210 determines the target reduction value DA of the least ink on the basis of the difference ΔR (S125). The CPU 210 determines the reduction rates of the least ink (for example, TDy, GDy, and PDy) on the basis of the target reduction value DA (S135). Appropriate reduction rates can be determined by using the difference ΔR between the remaining amount of the most ink and that of the least ink.

According to the print process of the second embodiment, the CPU 210 determines the reduction rates (for example, TDc, GDc, and PDc) of the ink whose remaining amount is the second smallest (for example, C ink) on the basis of the determined reduction rates (for example, TDy, GDy, and PDy) of the least ink (for example, Y ink) (S140). Appropriate reduction rates can thus be determined for an ink other than the least ink.

According to the print process of the second embodiment, the CPU 210 obtains the post-printing remaining amount information as the remaining amount information (S110). The post-printing remaining amount information indicates the remaining amounts of the plurality of types of inks estimated on the assumption that the target image OI is printed without performing the reduction process. Appropriate reduction rates can thus be determined by estimating the remaining amounts of the respective inks after the printing.

According to the print process of the second embodiment, the CPU 210 calculates the amounts (for example, Cy_Ob1, Cy_Ob2, and Cy_Ob3) of the least ink (for example, Y ink) to be used in printing the target image OI before (or without) performing the reduction process by using the target image data (CMYK image data after the color conversion process) for each of the text Ob1, the graphic Ob2, and the photograph Ob3 in the target image OI (S130). The CPU 210 determines the reduction rates (for example, TDy, PDy, and GDy) of the least ink on the basis of the amounts of the least ink to be used (S135). Accordingly, appropriate reduction rates can be determined on the basis of the amounts of ink to be used for the respective objects.

According to the second embodiment, the Y ink and the C ink are examples of a first type color material and a second type color material respectively. The text object Ob1 and the graphic object Ob2 are examples of a first type object and a second type object, respectively. The reduction rate TDy of the Y ink for text and the reduction rate TDc of the C ink for text are examples of a first reduction index value and a third reduction index value respectively.

C. Modifications (1) In the first embodiment, the least ink is identified in S30 of FIG. 3 by using the remaining amounts Rc, Rm, Ry, and Rk (pre-printing remaining amount information) of the plurality of types of inks before the target image OI is printed. Alternatively, in the first embodiment, S105 and S110 of FIG. 6 may be performed to calculate the remaining amounts Rpc, Rpm, Rpy, and Rpk of the inks after the printing, and the least ink may be identified by using the remaining amounts Rpc, Rpm, Rpy, and Rpk of the inks after the printing (i.e., post-printing remaining amount information).

(2) In the second embodiment, the target reduction value DA is determined by performing S115 to S125 of FIG. 6, using the remaining amounts Rpc, Rpm Rpy, and Rpk of the inks after the printing. Alternatively, in the second embodiment, the target reduction value DA may be determined by performing S115 to S125 of FIG. 6, using the remaining amounts Rc, Rm, Ry, and Rk of the plurality of types of inks before the target image OI is printed. That is, the remaining amounts of the least ink and the most ink are identified from among the remaining amounts Rc, Rm, Ry, and Rk, and the difference ΔR is calculated between the identified remaining amounts of the least ink and the most ink. In such a case, the processes S105 and S110 of FIG. 6 may be omitted.

(3) In the first embodiment, the least ink may be identified from among the chromatic C, M, and Y inks without considering the achromatic K ink. Similarly, in the second embodiment, the least ink and the most ink may be identified from among the chromatic C, M, and Y inks without considering the achromatic K ink.

(4) In the embodiments, all the objects, i.e., the text Ob1, the graphic Ob2, and the photograph Ob3 are identified in the object identification process of S15. Alternatively, in S15, only the text Ob1 may be identified by using known character recognition process. The other objects may be left unidentified. In such a case, in the embodiments, for example, the reduction rate of the least ink may be determined only for the text Ob1. The reduction process for reducing the amount of the least ink to be used according to the reduction rate may be performed only on the text. In other words, in the reduction process, the consumption amounts of the least ink in printing the graphic Ob2 and the photograph Ob3 may be left not reduced.

(5) In the first embodiment, in S35 of FIG. 3, the CPU 210 determines the reduction rates of the amounts of the least ink to be the predetermined reduction rates TD, GD, and PD. Alternatively, for example, the CPU 210 may determine the target reduction value DA on the basis of the difference ΔR between the remaining amounts of the most ink and the least ink similarly to the second embodiment. The CPU 210 may determine reduction rates TD, GD, and PD so that the amount of the least ink to be used is reduced as much as the target reduction value DA. Here, the difference ΔR may be determined using remaining amounts Rc, Rm, Ry, and Rk or using remaining amounts Rpc, Rpm Rpy, and Rpk as explained in the modification (2).

(6) In the embodiments, different reduction rates are determined for text, a graphic, and a photograph. Alternatively, the common reduction rate may be determined for text and a graphic, and a reduction rate lower than that for text and a graphic may be determined only for a photograph. The common reduction rate may be determined for a graphic and a photograph, and a reduction rate higher than those for a graphic and a photograph may be determined only for text.

(7) In the print process according to the embodiments, the processes S10 to S75 may be performed, for example, by another computer communicably connected to the multifunction peripheral 200. Specifically, the processes may be performed by the user's terminal device such as a personal computer and a smartphone. In such a case, a CPU of the terminal device executes a printer driver program installed in the terminal device to implement the processes S10 to S75. Alternatively, the processes may be performed by a server connected to the Internet. In such a case, the server may include a computer. Or, the server may be configured as a so-called cloud server including a plurality of computers capable of communicating with each other.

(8) If the processes S10 to S75 are performed by another computer communicably connected to the multifunction peripheral 200 as described above, for example, remaining amount information obtained in S25 may be information indicating the least ink among the plurality of types of inks instead of the information Rc, Rm, Ry, and Rk indicating the remaining amounts of the inks themselves. More specifically, the CPU 210 of the multifunction peripheral 200 may identify the least ink on the basis of the remaining amounts of the inks, and transmit the information specifying the least ink to another computer. In general, the remaining amount information about the inks may be information based on the remaining amounts of the inks (for example, information indicating the remaining amounts of the inks themselves or information specifying the least ink).

(9) Part of the configurations of the embodiments implemented in hardware described above may be replaced by software and, conversely, part of the configurations in software may be replaced by hardware.

(10) When all or part of the functions in the present disclosure are implemented by computer programs, the programs can be stored on a computer-readable storage medium (a non-temporary storage medium, for example). The programs may be used from the same storage medium on which they are provided (an example of a computer-readable storage medium), or may be first loaded onto a different storage medium (an example of a computer-readable storage medium). The "computer-readable storage medium" may be a portable medium, such as a memory card or CD-ROM; an internal storage built into the computer, such as any of various ROM; or an external storage, such as a hard disk drive connected to the computer.

While the disclosure has been described in detail with reference to the above embodiments, it would be apparent to those skilled in the art that various changes and modifications may be made thereto.

What is claimed is:

1. An image processing apparatus comprising a controller configured to perform:
    acquiring target image data representing a target image including a plurality of types of objects, the plurality of types of objects including a first type of object having a first attribute, and a second type of object having a second attribute different from the first attribute;
    acquiring remaining amount information regarding a remaining amount of each of a plurality of types of color materials used for printing the target image, the plurality of types of color materials having a first type of color material and a second type of color material different from the first type of color material;
    specifying the first type of object among the plurality of types of objects;
    specifying, as a specific type of color material, one of the first type of color material and the second type of color material, the remaining amount of the specific type of color material being smaller than that of the other of the first type of color material and the second type of color material;
    determining a first reduction index value, the first reduction index value indicating a first degree of reduction in an amount of the specific type of color material to be used when the first type of object is printed; and
    creating color correction processed data by performing a reduction process on the target image data, the reduction process reducing an amount of the specific type of color material to be used in printing the first type of object on the basis of the first reduction index value such that an amount of the specific type of color material to be used when printing the first type of object with performing the reduction process is reduced as compared with an amount of the specific type of color material to be used when printing the first type of object without performing the reduction process, wherein an amount of the specific type of color material to be used in printing the second type of object is not reduced on the basis of the first reduction index value.

2. The image processing apparatus according to claim 1, wherein the determining further determines a second reduction index value, the second reduction index value indicating a second degree of reduction in an amount of the specific color material to be used when the second type of object is printed;
    wherein the second degree is smaller than the first degree,
    wherein in the reduction process an amount of the first type of color material to be used when printing the second type of object is reduced on a basis of the second reduction index value.

3. The image processing apparatus according to claim 1, wherein in the reduction process, an amount of the specific type of color material to be used in printing the second type of object is not reduced.

4. The image processing apparatus according to claim 1, wherein the specifying specifies, as the specific type of color material, a type of color material whose remaining amount is smallest among the plurality of types of color materials.

5. The image processing apparatus according to claim 1, wherein in a case where the specific color material is the first type of color material, the determining determines the first reduction index value indicating the first degree of reduction,
    wherein in the case where the specific color material is the first type of color material, the controller is further configured to perform determining a third reduction index value indicating a third degree of reduction in an amount of the second type of color material to be used when the first type of object is printed,
    wherein the third degree is smaller than the first degree,
    wherein in the reduction process an amount of the second type of color material to be used when printing the first type of object is reduced on a basis of the third reduction index value.

6. The image processing apparatus according to claim 5, wherein the determining further includes determining a plurality of reduction index values corresponding to respective ones of the plurality of types of color materials, the plurality of reduction index values including the first reduction index value and the third reduction index value, each of the plurality of reduction index values indicating a degree of reduction in an amount of a corresponding one of the plurality of color materials to be used when the first type of object is printed,
    wherein the plurality of reduction index values is determined so that as the remaining amount of the color material is low, the corresponding degree of reduction is high,
    wherein in the reduction process each of the plurality of amounts of the specific type of color material to be used when printing the first type of object is reduced on a basis of the corresponding reduction index value.

7. The image processing apparatus according to claim 6, wherein the first type of color material has a remaining amount which is smallest among the remaining amounts of the plurality of types of color materials,
    wherein the second type of color material has a remaining amount which is largest among the remaining amounts of the plurality of types of color materials,
    wherein the determining further includes:
    calculating a difference between the remaining amount of the first color material and the remaining amount of the second color material; and determining a target value with respect to a reduction amount of the first type of color material, wherein the determining determines the first degree on a basis of the target value.

8. The image processing apparatus according to claim 7, wherein the determining determines the third reduction index value on a basis of the determined first reduction index value.

9. The image processing apparatus according to claim 2, wherein the determining further includes determining a plurality of types of reduction index values corresponding to respective ones of the plurality of types of objects, the plurality of types of reduction index values including the first reduction index value and the second reduction index value, each of the plurality of types of reduction index values indicating a degree of reduction in an amount of the specific type of color material to be used when the corresponding type object is printed, wherein the plurality of types of reduction index values is determined so that the degrees of reduction amounts of the plurality of types of reduction index values increases in a prescribed order of the corresponding plurality of types of objects, wherein in the reduction process each of the plurality of amounts of the specific type of color material to be used when printing the corresponding one of the plurality of types of objects is reduced on a basis of the corresponding reduction index value.

10. The image processing apparatus according to claim 2, wherein the first type of object is text and the second type object is different from the text.

11. The image processing apparatus according to claim 1, wherein the remaining amount information includes at least one of pre-printing information and post-printing information, the pre-printing information indicating remaining amounts of the plurality of types of color materials before the target image is printed, the post-printing information indicating estimated remaining amounts of the plurality of types of color materials if the target image is printed.

12. The image processing apparatus according to claim 1, wherein the controller is further configured to perform:

estimating a first amount of the specific type of color material to be used in printing the first type of object; and estimating a second amount of the specific type of color material to be used in printing the second type of object, wherein the determining determines the first reduction index value on a basis of the remaining amount information, the first amount, and the second amount.

13. A non-transitory computer readable storage medium storing a set of program instructions installed on and executed by a computer, the set of program instructions comprising:

acquiring target image data representing a target image including a plurality of types of objects, the plurality of types of objects including a first type of object having a first attribute, and a second type of object having a second attribute different from the first attribute;

acquiring remaining amount information regarding a remaining amount of each of a plurality of types of color materials used for printing the target image, the plurality of types of color materials having a first type of color material and a second type of color material different from the first type of color material;

specifying the first type of object among the plurality of types of objects;

specifying, as a specific type of color material, one of the first type of color material and the second type of color material, the remaining amount of the specific type of color material being smaller than that of the other of the first type of color material and the second type of color material;

determining a first reduction index value, the first reduction index value indicating a first degree of reduction in an amount of the specific type of color material to be used when the first type of object is printed; and creating color correction processed data by performing a reduction process on the target image data, the reduction process reducing an amount of the specific type of color material to be used in printing the first type of object on the basis of the first reduction index value such that an amount of the specific type of color material to be used when printing the first type of object with performing the reduction process is reduced as compared with an amount of the specific type of color material to be used when printing the first type of object without performing the reduction process, wherein an amount of the specific type of color material to be used in printing the second type of object is not reduced on the basis of the first reduction index value.

* * * * *